United States Patent [19]

Chen

[11] Patent Number: 5,049,438
[45] Date of Patent: Sep. 17, 1991

[54] NONDIAPHANOUS NONWOVEN FABRIC

[76] Inventor: Ching-Long Chen, 101-15, Cherng Fu Industry Park, Cherng Fu Lih, San Hsia, Taipei Hsien, Taiwan

[21] Appl. No.: 503,055

[22] Filed: Apr. 2, 1990

[51] Int. Cl.$^5$ .............................................. D04H 1/04
[52] U.S. Cl. .................................... 428/284; 428/296
[58] Field of Search ............... 428/171, 284, 287, 296

[56] References Cited

U.S. PATENT DOCUMENTS

| | | | |
|---|---|---|---|
| 4,275,105 | 6/1981 | Boyd et al. | 428/296 |
| 4,586,606 | 5/1986 | Howey | 428/296 |
| 4,686,136 | 8/1987 | Homonoff et al. | 428/296 |
| 4,719,144 | 1/1988 | Komat | 428/284 |
| 4,798,757 | 1/1989 | Modrak et al. | 428/296 |

Primary Examiner—James J. Bell
Attorney, Agent, or Firm—Asian Pacific International Patent and Trademark Office

[57] ABSTRACT

A kind of highly nondiaphanous nonowoven laminate consists of a inner black nontransparent lamina of non-thermoplastic long staple fibers and two outer laminae of thermoplastic fiber. It is processed through heating, press and bonding of the three laminae of fiber web together. Therefore, it possesses the properties of high nondiaphaneity, wrinkle resistance, good appearance and touch to hands and is very suitable for uses as screens, cover cloth and other non-transparent piece-goods.

4 Claims, 4 Drawing Sheets

NONDIAPHANOUS NONWOVEN FABRIC

BACKGROUND OF THE INVENTION

This invention is concerned a kind of highly nondiaphanous fabric, and in particularly it relates to the sort of thermoplastic fiber with inner nontransparent materials.

Generally speaking, the plastic materials, being used for blinds or window screens in houses and cars, have high shielding effect to light. However, it is not easy to process embossed printing or other kinds of finishing and its appearance lacks variation.

On the contrary, nonwoven fabric is relatively easy to process various finishings for better appearances and touch to hands. This can explain why many manufacturers use nonwoven fabrics instead of plastic materials to produce decorative blinds or window screens. But due to the porosity of nonwoven fabrics and its some degree of transparency to light, its shielding effect to light is not as good as that of traditional plastic screens.

To solute the problem of poorer shielding effect of nonwoven fabrics compared with plastic materials, resin is used to bond nonwoven fabric to another nontransparent base like plastic film, aluminum foil and so on. Alternatively ultrasonic adhering technique can also be used to replace the above method to stick a lamina of nondiaphanous substance to nonwoven fabric.

This two methods substantially aim to bond two laminae of materials into one laminate. The process is much more complicated and the cost is much higher than that of producing simple nonwoven fabric or plastic material. Moreover, since the surfaces of fabric bonded with plastic film or aluminum foil usually always has air gaps, its surfaces seem to be coarser than that of the original material. In addition, the defects of scorch, crevices shrinkage, falling off and imperfact bonding, etc, are not uncommon, which are resulted from improper resin density, uneven coating and improper control of heat, pressure and temperature in process.

SUMMARY OF THE INVENTION

This invention can overcome the problem of diaphaneity of nonwoven fabric. It is totally different from what we just mentioned in previous paragraph about the techniques of adhering nonwoven fabric to a lamina of plastic film or aluminum foil. Therefore, it does not have the shortcomings of high fabrication cost and complicating operations when using ultrasonic or resin to bond, not to mention the high percentage of air gap, rough surface and other defects.

Substantially, invention directly provides a highly diaphanous nonwoven fabric instead of adhering a piece of nontransparent material to nonwoven fabric. This sort of highly diaphanous nonwoven fabric is produced from three sets of parallelly installed preparing and weaving equipment. It is actually a laminated fiber webs with a inner lamina of dark color fiber, e.g. black color fiber, and a top and bottom laminae of any color. At least one of the laminae is formed of low melting point thermoplastic materials such as nylon 6 (caprolatam). This special fiber web is transferred by a conveyer to a thermobonding machine for heating and press in order to bond the low melting point thermoplastic fiber to non-thermoplastic long stapled fiber web.

Each set of preparing and weaving equipment consists of a set of identical or different hopper bale breaker, blending feeder, opener, automatic weighting hopper feeder, carding device and/or laying lapper. The three sets of preparing and weaving equipment separately open and mix black and other color fibers, forming laminate of fiber web with the black one in center.

An object of this invention is to provide a nontransparent nonwoven fabric which is easy to be embossed.

Another object of this invention is to provide a new nontransparent nonwoven fabric as mentioned, which is easy to produce and can be finished in one process, greatly simplifying and reducing the cost of fabrication process.

A yet another object of this invention is a nontransparent nonwoven fabric as mentioned, which has good appearance and no air gap, being good to touch and not rough.

A further object of this invention is that such fabric is cease resistant and dimensionally stable.

A yet further object of this invention is that fraction defective of such nontransparent nonwoven fabric provide is not higher than common nonwoven fabric.

BRIEF DESCRIPTIONS OF THE DRAWINGS

The drawings disclose an illustrative embodiment of the present invention which serves to exemplify the various advantages and objects hereof, and are as follows.

DETAILED DESCRIPTIONS OF THE PREFERRED EMBODIMENT

Figure 1:
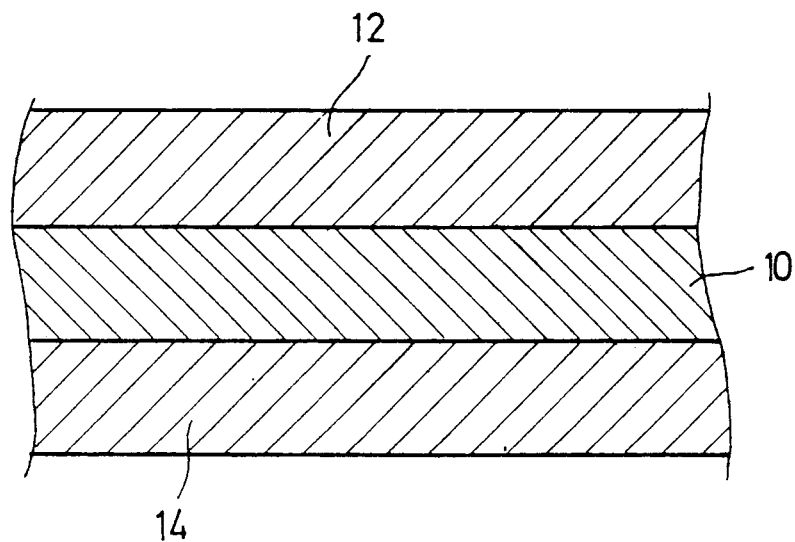
FIG. 1 is a cross-sectional view of the laminate of this invention prior to bonding.

Referring to figures, FIG. 1 shows the laminated nonwoven fabrics prior to bonding. It consists of an inner lamina 10 of dark color particularly referring to black color fiber web with high light shielding ability to light, and two outer laminae of the same or different color above and below the inner lamina 10, at least one of the three laminae being made of thermoplastic fiber such as nylon 6 or the blend of nylon 6 and non-thermoplastic long cellulose fiber. Although any kind of thermoplastic fibers, e.g. acetate ester, acrylic olefin, vinylon, polyalkene, or polyamide, can be used as the raw material of the inner or outer lamina of the nonwoven fiber, nylon 6 fiber is the preferred one. Nylon 6 fiber is composed of long filaments of polyamide with less than 85% amide chain directly attached to di-aromatic ring. The long non-thermoplastic fiber can be either rayon or other cellulose fibers where rayon is preferred.

Various methods, including but not restricted to hot pressing or ultrasonic wave, can be used to bond laminae or separated points. In bonding, maximum use of heat aims to soften or melt the low melting point thermoplastic fiber. However, during heating, fiber is kept under tension to prevent excessive or uneven contraction. The inner and any, one of the outer laminae, are separately made of a multi-layer fiber web.

EXAMPLE

A preferred embodiment of this invention includes an inner lamina and two laminae one above and one below the inner lamina, where the inner lamina is made of 100% black long rayon staple fibers of 19/16 inches length and 1.5 denier thickness. The two outer laminae are made of 80%/20% blends of thermoplastic nylon 6 staple fibers and non-thermoplastic cellulose rayon staple fibers. The two outer laminae are identical but can be any color. The 80% nylon 6 staple fiber is 3.0 denier thickness, and 2.2 inches length, and its melting point lies between 419° F. and 430° F. The 20% rayon staple fiber is 1.5 denier thickness and 19/16 inches length and does not melt when heated. The laminate are conveyed through a hot pressing machine. The nonwoven webs is heated to 525° F. and pressed with 100 psi so as to bond the laminae or scattered glue points. The residence time of nonwoven web in hot pressing machine is $5.2 \times 10^{-4}$ second. The weight and thickness at zero load of nonwoven fabric after bonding are respectively 28 g per square yard and 0.12 centimeter.

The inner lamina of the nonwoven laminate, being made of black nonthermal plastic fibers, has high light shielding effect. Light is absorbed mostly by the black fibers after entering the laminae. The coefficient of nondiaphaneity depends on the density and thickness of the laminae, especially the black inner lamina. The coefficient of nondiaphaneity of the above mentioned laminated nonwoven fabric is greater than 96%, and the touch to hands and appearance and the thickness at zero load are almost the same as those of common nonwoven fabrics.

Figure 2:
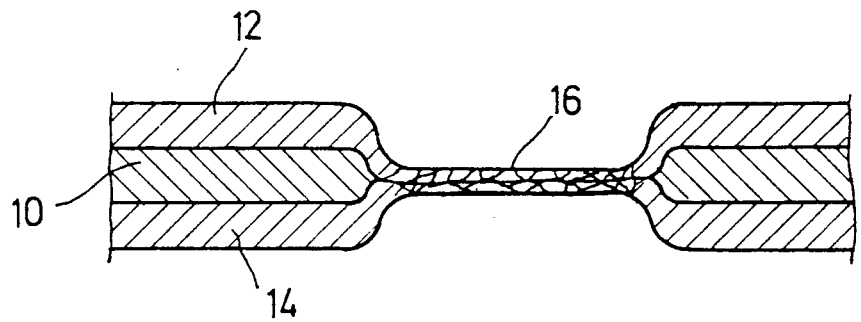
FIG. 2 is a cross-sectional view of the nondiaphanous nonwoven laminate after bonding fabrication.

FIG. 2 shows the sectional view of the laminated nonwoven fabric. After bonding, scattered part 16 or entire surface of inner and outer laminae can be bonded. During the bonding process, the thermoplastic fibers in outer lamina are melted to glue and embraces the non-thermoplastic rayon fibers in the inner lamina.

Figure 3:
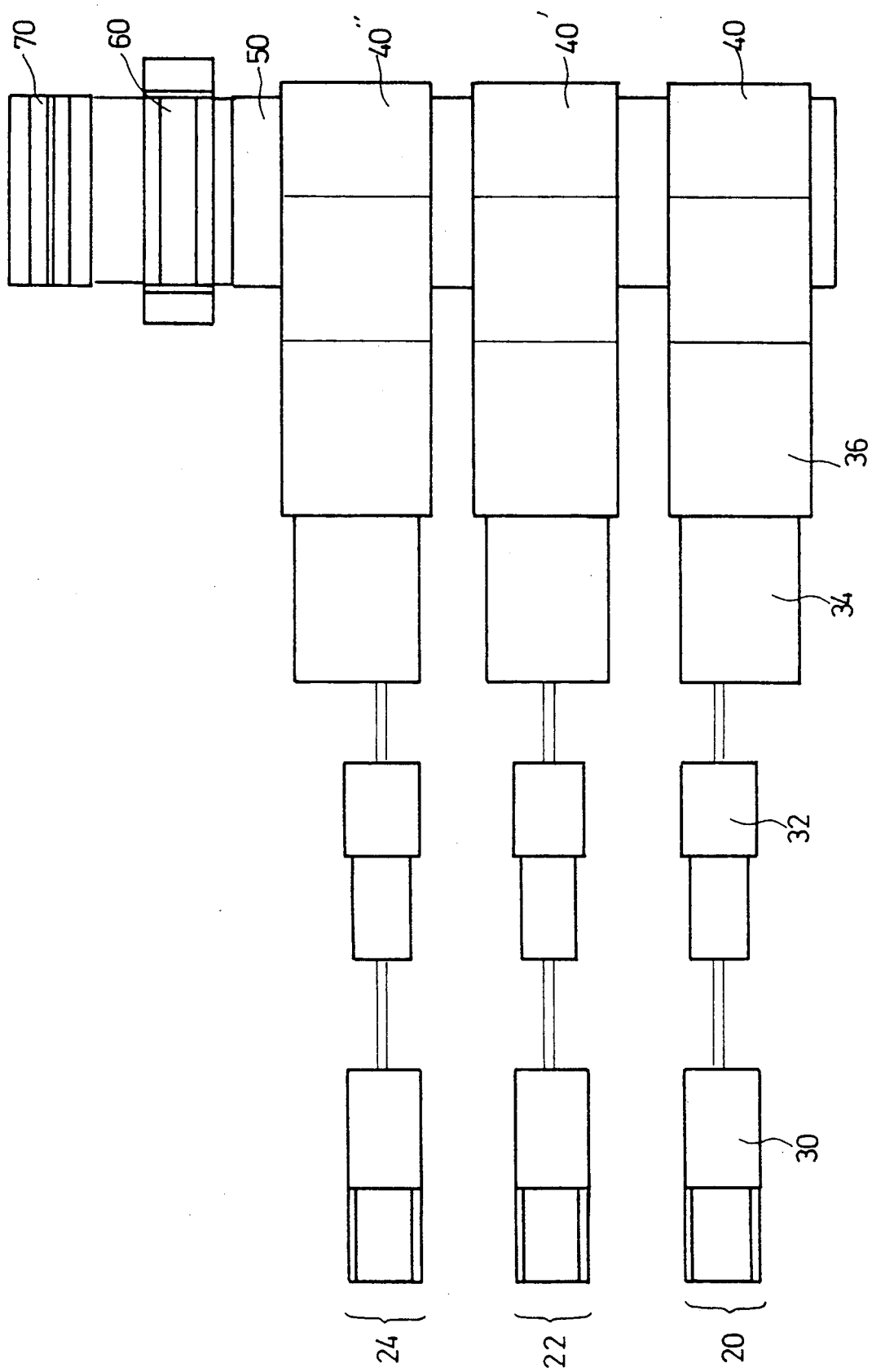
FIG. 3 is a top view of the fabrication equipment for nondiaphanous nonwoven fabrics.
Figure 4:
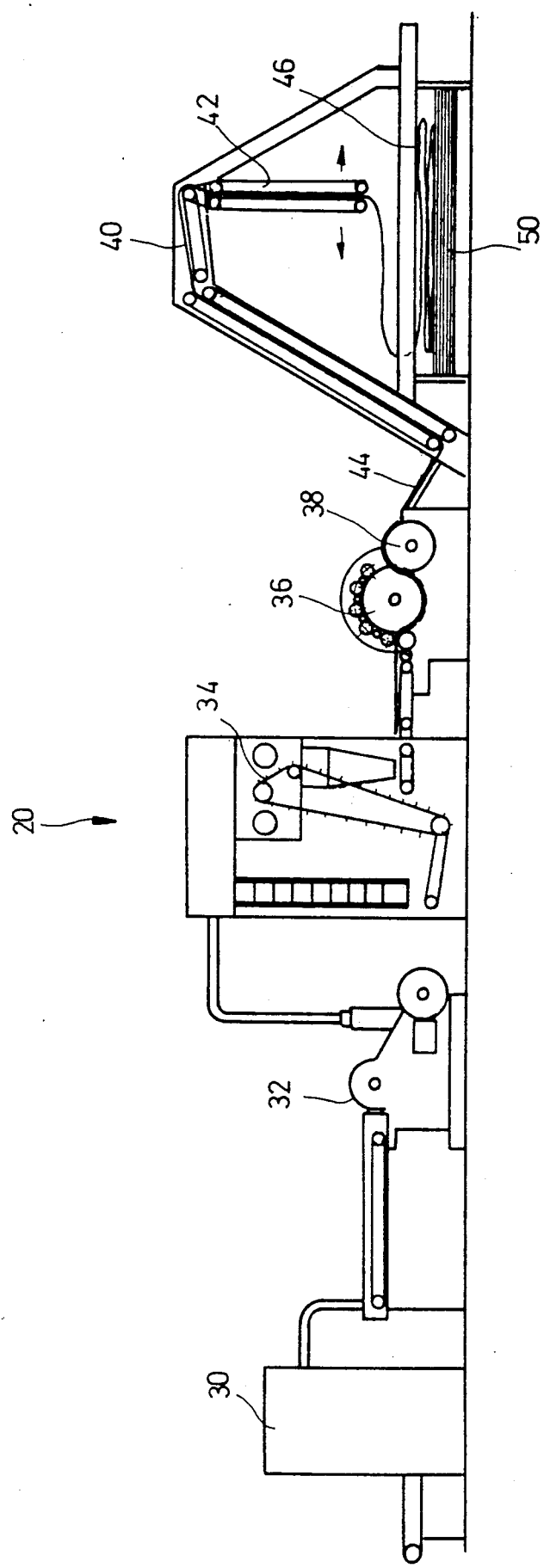
FIG. 4 is a frontal perspective view of the fabrication equipment for nondiaphanous nonwoven fabrics.
Figure 5:
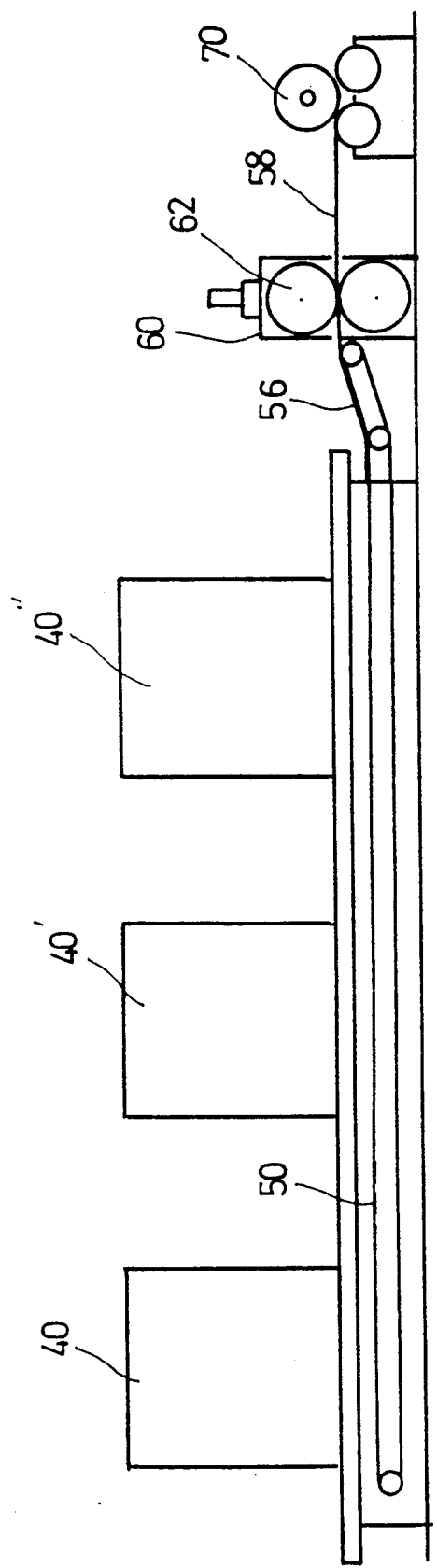
FIG. 5 is a right side view of the fabrication equipment for nondiaphanous nonwoven fabrics.

FIGS. 3, 4 and 5 illustrates the fabrication equipment for nontransparent nonwoven fabric, which includes 3 parallelly installed sets of preparing and weaving machines 20, 22, 24, a conveyor 50 perpendicular to preparing and weaving machines, a hot pressing machine 60 at the end of conveyor 50 and a winding club 70. The first and third sets of preparing and weaving machines 20, 24 on each side are used for weaving the outer nonwoven fiber webs of any colors. The inner one, on the other hand, is used for weaving inner black nonwoven fiber web. The three laminae of nonwoven fabric web are delivered through conveyor to hot pressing machine and bonded into one laminated fabric. The temperature and pressure are determined by the property of fibers, expected thickness and the effective length of processing route. The laminated nontransparent nonwoven fabric after being bonded is wound on the winding club 70.

Referring to FIG. 4, the second set of preparing and weaving machine 22, 24 possesses the same or different types of devices as that of the first set 20. The first set machines include a hopper bale breaker (not shown) for braking fiber bundles, a mixing room 30 for blending various kinds of fibers, (e.g. thermoplastic nylon 6, non-thermalplastic cellulose fibers), and an opener 32 for loosening fibers and removing impurities.

These processes can affect the arrangement of fibers. Because of the incompleteness of blending and loosening, there will be fiber clumps and the defects of uneven product density and bond strength. Therefore, when necessary fibers are opened for several times. There is also a weighting device 34 for supplying the carding device 36 with a fixed quantity of loosened fibers for maintaining the quality. Carding device cards fibers to loosen and arrange fibers and remove impurities. The carded fibers are delivered to a doffer 38 to form a sheer web 44 like a spider web.

The fiber web is fed into a lapping device 40 and folded continuosly into a pile of fabric web 46 by an arm moving back and forth and transferred through a conveyor 50. This lapped fiber web is one of the above mentioned outer laminae of non-transparent nonwoven laminate.

Referring to FIG. 5, the first and the third lapping devices 40 and 40" are used for weaving lapped fiber webs which are used as the outer laminae and of same or different colors on the continuosly moving conveyor. The second lapping device 40 weaves and feeds black fiber web to the conveyor 50, which is used as the inner lamina of the nontransparent laminate. The arm in each set slants in a proper angle with the conveyor in order to guarantee the continuous feed of lapped fiber webs with a black. The multi-layer fiber web 56 are conveyed to hot pressing machine 60 for heating and press so as to melt or soften the low melting point thermoplastic fiber like nylon 6 fiber in outer laminae and to bond the outer and inner laminae. The heating roller 62 in hot pressing machine can be installed with of surface finishing device or a polishing roller to give embossing or polishing finish, giving a appearance and shining surfaces. The winding roller 70 winds the hot pressed nontransparent nonwoven fabric 58.

Since the nontransparent nonwoven fabric produced by the above equipment has good property of nondiaphaneity and is formed in one continuous process, the fabrication process is effectively simplified and its cost is largely reduced compared with the traditional adhered materials. The nontransparent laminated nonwoven fabric can be easily embossed and polished to have good touch to hands and appearance. It is especially suitable to be used as the material of venetian blinds and screens for shielding of light and/or decoration.

As indicated, the structure herein may be variously embodied. Recognizing various modifications will be apparent, the scope hereof shall be deemed to be defined by the claims as set forth below.

What is claimed is:

1. An opaque flexible wrinkle-resistant non-woven fabric comprising an inner layer and two outer layers thermally bonded to opposite surface areas of said inner layer; said inner layer consisting of 100% of discrete opaque fibers that are dimensionally stable at the temperatures used to bond the layers together; each said outer layer consisting of a mixture of discrete fibers that is approximately 80% thermoplastic fiber material and 20% opaque fiber material dimensionally stable at the temperatures used to bond the layers together; said thermoplastic fibers being blended with the associated opaque fibers so that the opaque fibers in each outer layer are evenly dispersed; said thermoplastic fibers layer being fusible to bond the opaque fibers together.

2. The non-woven fabric of claim 1 wherein the opaque fibers are rayon.

3. The non-woven fabric of claim 1 wherein the opaque fibers are rayon, and the thermoplastic fibers are nylon.

4. The non-woven fabric of claim 1 wherein substantially all of the thermoplastic fibers are fused to the opaque dimensionally stable fibers.

* * * * *